(12) United States Patent
Illindala et al.

(10) Patent No.: US 10,496,420 B2
(45) Date of Patent: Dec. 3, 2019

(54) CONTEXTUAL HELP WITHIN AN APPLICATION

(71) Applicant: CERNER INNOVATION, INC., Kansas City, KS (US)

(72) Inventors: Uday Illindala, Overland Park, KS (US); Adam B. Splitter, Kansas City, MO (US); John Bowen, Raymore, MO (US)

(73) Assignee: Cerner Innovation, Inc., Kansas City, KS (US)

( * ) Notice: Subject to any disclaimer, the term of this patent is extended or adjusted under 35 U.S.C. 154(b) by 407 days.

(21) Appl. No.: 14/704,558

(22) Filed: May 5, 2015

(65) Prior Publication Data

US 2016/0154656 A1    Jun. 2, 2016

Related U.S. Application Data

(60) Provisional application No. 62/086,530, filed on Dec. 2, 2014.

(51) Int. Cl.
    *G06F 9/451* (2018.01)
    *G06F 17/30* (2006.01)
    *G06F 16/332* (2019.01)

(52) U.S. Cl.
    CPC .......... *G06F 9/453* (2018.02); *G06F 16/3329* (2019.01)

(58) Field of Classification Search
    CPC .... G06F 9/4446; G06F 3/04895; G06F 9/453; G06F 16/3329
    USPC ....................................................... 715/708
    See application file for complete search history.

(56) References Cited

U.S. PATENT DOCUMENTS

| | | | | |
|---|---|---|---|---|
| 6,029,158 A | * | 2/2000 | Bertrand | G06F 9/453 706/45 |
| 6,871,322 B2 | * | 3/2005 | Gusler | G06F 9/453 715/708 |
| 6,973,620 B2 | * | 12/2005 | Gusler | G06F 9/453 715/708 |
| 7,865,829 B1 | * | 1/2011 | Goldfield | G06F 9/453 715/708 |
| 2002/0035478 A1 | * | 3/2002 | Levitt | G06F 9/453 434/107 |

(Continued)

OTHER PUBLICATIONS

Brian Satterfield, "Eleven Tips for Troubleshooting Software", published on Feb. 27, 2012, https://www.techsoup.org/support/articles-and-how-tos/eleven-tips-for-troubleshooting-software (Year: 2012).*

(Continued)

*Primary Examiner* — Daniel Samwel
(74) *Attorney, Agent, or Firm* — Shook, Hardy and Bacon, L.L.P.

(57) ABSTRACT

A method, system, and medium are provided for supplying contextual help to a user of an application. A problem encountered by the user while using the application is identified in real time. Identifying the problem may include identifying the current user task, based at least on application checkpoints encountered by the user. In response to identifying the problem encountered by the user in real time, the user is provided with short-term help and long-term help that address the problem. The short-term and long-term help may be identified based at least in part on mappings that associate user tasks with help information applicable to the user tasks.

12 Claims, 3 Drawing Sheets

(56) References Cited

U.S. PATENT DOCUMENTS

| | | | | |
|---|---|---|---|---|
| 2004/0268259 A1* | 12/2004 | Rockey | G06F 9/4446 | 715/708 |
| 2006/0047538 A1* | 3/2006 | Condurso | G06F 19/326 | 705/3 |
| 2006/0053372 A1* | 3/2006 | Adkins | G06F 9/453 | 715/709 |
| 2006/0085750 A1* | 4/2006 | Easton, Jr. | G06F 9/4446 | 715/708 |
| 2008/0126932 A1* | 5/2008 | Elad | G06F 9/453 | 715/705 |
| 2008/0307413 A1* | 12/2008 | Ferris | G06F 8/60 | 717/178 |
| 2009/0088197 A1* | 4/2009 | Stewart | G06F 9/4446 | 455/550.1 |
| 2010/0050079 A1* | 2/2010 | Thompson | G06F 9/4446 | 715/708 |
| 2010/0192063 A1* | 7/2010 | Saoumi | G06F 9/453 | 715/707 |
| 2011/0177480 A1* | 7/2011 | Menon | G09B 7/00 | 434/238 |
| 2011/0246880 A1* | 10/2011 | Horton | G06F 9/453 | 715/708 |
| 2012/0115122 A1* | 5/2012 | Bruce | G09B 7/00 | 434/323 |
| 2012/0162443 A1* | 6/2012 | Allen | G06F 3/012 | 348/207.1 |
| 2013/0054262 A1* | 2/2013 | Edwards | G06Q 10/06 | 705/2 |
| 2013/0238991 A1* | 9/2013 | Jung | G06F 3/048 | 715/708 |
| 2013/0290110 A1* | 10/2013 | LuVogt | G06F 17/30867 | 705/14.66 |
| 2013/0290339 A1* | 10/2013 | LuVogt | G06F 17/30867 | 707/740 |
| 2013/0290905 A1* | 10/2013 | LuVogt | G06N 3/006 | 715/835 |
| 2014/0139551 A1* | 5/2014 | McCulloch | G09G 5/377 | 345/633 |
| 2014/0184508 A1* | 7/2014 | Tamasi | G06F 1/1632 | 345/161 |
| 2014/0245141 A1* | 8/2014 | Yeh | G06F 3/0481 | 715/708 |
| 2014/0287397 A1* | 9/2014 | Chong | G09B 5/12 | 434/350 |
| 2015/0242504 A1* | 8/2015 | Profitt | G06F 3/04842 | 707/767 |
| 2015/0298003 A1* | 10/2015 | McMain | A63F 13/49 | 463/24 |
| 2016/0020963 A1* | 1/2016 | Jhoney | G06F 9/4446 | 709/219 |
| 2016/0093232 A1* | 3/2016 | Chong | G09B 19/0053 | 434/118 |
| 2016/0360382 A1* | 12/2016 | Gross | G06F 3/0488 | |
| 2017/0132391 A1* | 5/2017 | Morrison | G06F 19/3456 | |
| 2017/0262614 A1* | 9/2017 | Vishnubhatla | G06F 19/328 | |

OTHER PUBLICATIONS

Dwayne Spradlin, "Are You Solving the Right?", published on Sep. 2012, https://hbr.org/2012/09/are-you-solving-the-right-problem (Year: 2012).*

* cited by examiner

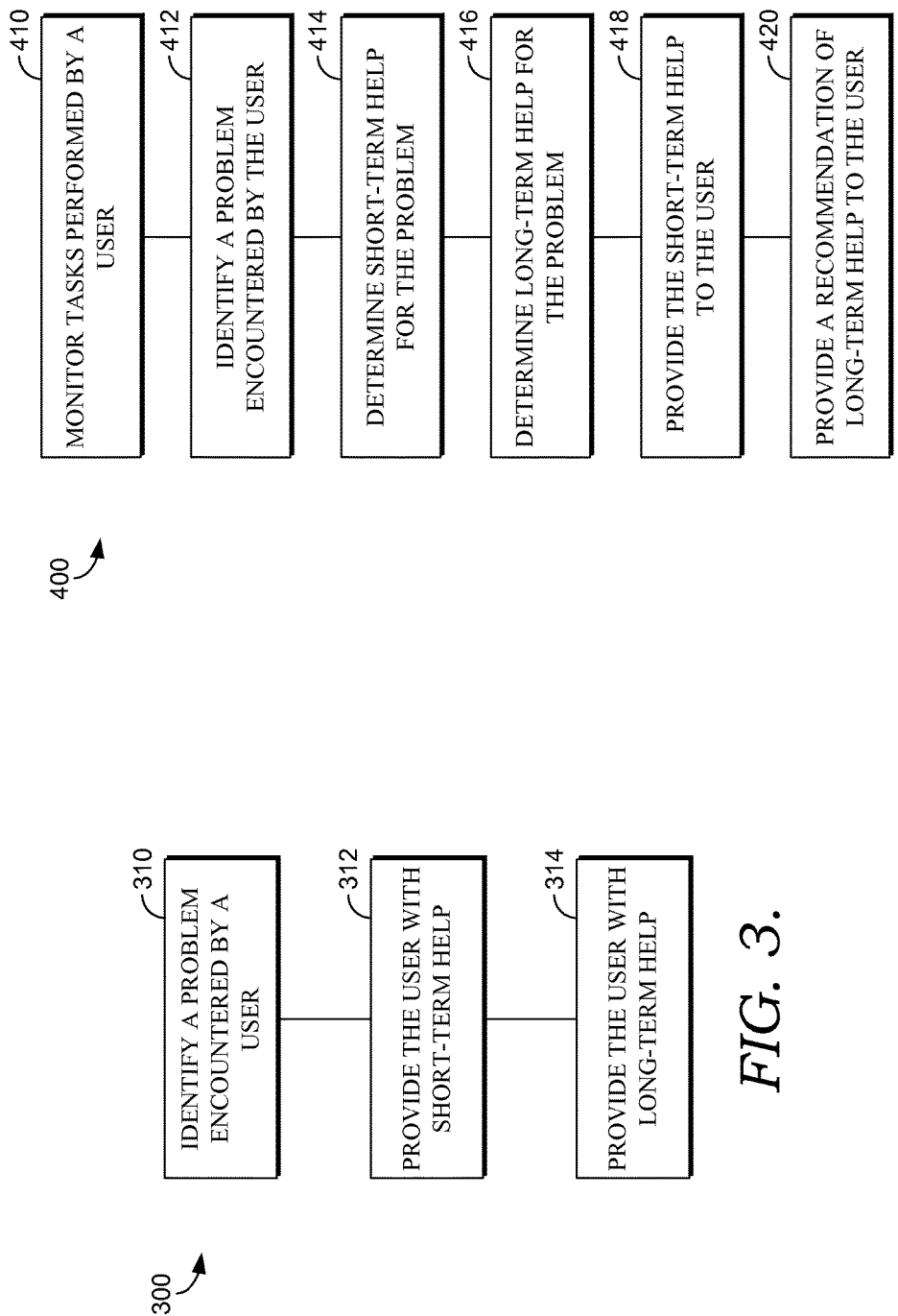

CONTEXTUAL HELP WITHIN AN APPLICATION

CROSS-REFERENCE TO RELATED APPLICATIONS

This application claims the priority to U.S. Provisional Application No. 62/086,530, filed Dec. 2, 2014, entitled "Contextual Help within an Application," which is incorporated herein by reference in its entirety.

BACKGROUND

Computer applications typically include some type of help feature enabling a user to search for information about how to perform various tasks within the application, solutions to problems encountered while attempting to perform a task, and the like. An application may provide a "help button," e.g., an icon, which a user can select to access a help feature that includes a means of navigating to an appropriate help topic. For example, a help feature may include an index of help topics arranged in a hierarchical fashion such that the user can navigate to a general topic, then navigate within that to a more specific topic. A help feature may also include a search function that allows a user to enter a search term related to a particular task or subject.

SUMMARY

A high-level overview of various aspects of an embodiment of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, ways to provide contextual help to a user of an application.

At a high level, contextual help may be provided to a user of an application in real time, i.e., while the user is using the application and has encountered a problem or difficulty performing a task. The user's actions while using the application may be monitored, such that when the user requests help, a determination can be made as to what task the user is attempting to perform within the application. Based on the particular task at hand, appropriate contextual help may be determined and may include a short-term solution to the problem encountered by the user while performing the task, i.e., an immediate solution enabling the user to complete the task at hand. The user is thus provided with help information, e.g., the immediate solution, which is tailored to the problem without having to search or browse through help menus. The contextual help may also include one or more contextual long-term solutions to the problem, e.g., information about available learning opportunities that would improve the user's proficiency at using the application to perform the task at hand. Learning opportunities may include classes, seminars, online tutorials, and the like.

A history of the user's usage of the application may be stored, including information identifying the application, the user, the user's employer or institution, the user's geographic location, which tasks the user performs within the application, timestamps associated with the tasks, and the like. A history may also be stored of learning opportunities previously presented to, and/or availed by, the user. When a user requests help within the application, the short-term and/or long-term solutions provided to the user may be based on any or all of the user's current context within the application, the user's usage history, and prior learning opportunities taken by, or provided to, the user. The short-term and/or long-term solutions provided to the user may also be based on usage history and performance of other users with regard to the task at hand.

BRIEF DESCRIPTION OF THE SEVERAL VIEWS OF THE DRAWINGS

Illustrative embodiments of the present invention are described in detail below with reference to the attached drawing figures, and wherein:

FIG. 3 is a flowchart depicting an exemplary method suitable for use with an embodiment of the present invention; and FIG. 4 is a flowchart depicting another exemplary method suitable for use with an embodiment of the present invention.

DETAILED DESCRIPTION

Figure 1:
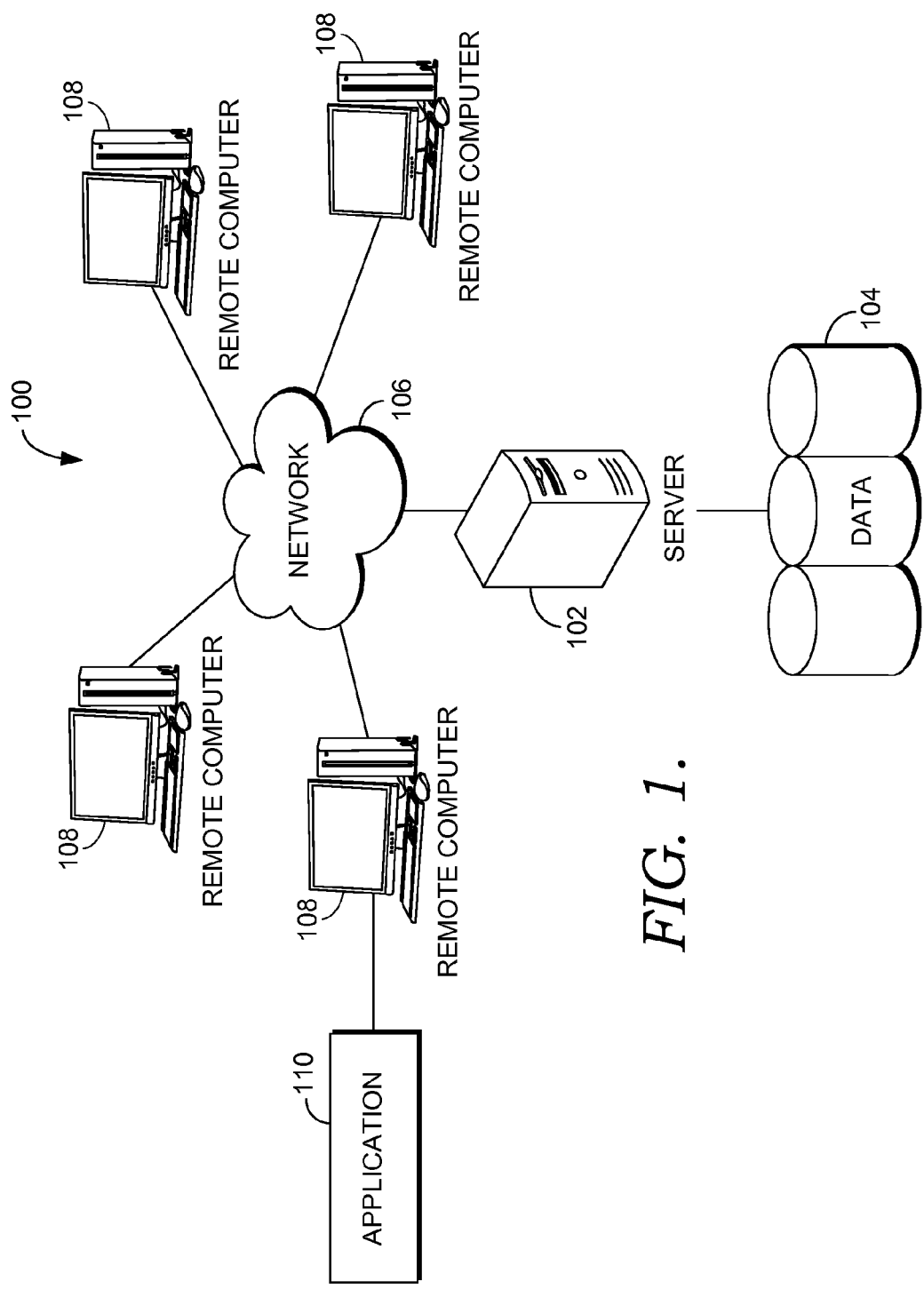
FIG. 1 is a block diagram of an exemplary computing environment suitable for use with an embodiment of the present invention.

The subject matter of select embodiments of the present invention is described with specificity herein to meet statutory requirements. But the description itself is not intended to define what we regard as our invention, which is what the claims do. The claimed subject matter may be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments may be embodied as, among other things: a method, system, or set of instructions embodied on one or more computer-readable media. Computer-readable media include media implemented for storing information. Examples of stored information include computer-useable instructions, data structures, program modules, and other data representations. By way of example, and not limitation, computer-readable media may comprise computer storage media. Computer-readable media include both volatile and nonvolatile media, removable and nonremovable media, and contemplate media readable by a database, a switch, and various other network devices. Media examples include hardware memory devices such as RAM, ROM, EEPROM, flash memory or other memory technology, CD-ROM, digital versatile discs (DVD), holographic media or other optical disc storage, magnetic cassettes, magnetic tape, magnetic disk storage, and other data storage devices. These technologies can store data momentarily, temporarily, or permanently. As used herein, computer-readable media do not include signals per se.

Some embodiments are described herein in terms of medical records processing systems, such as might be used in a hospital, doctor's office, or other clinical setting. However, some embodiments of the invention are not limited to any particular type of medical records processing systems, nor are they limited to medical applications in general. An embodiment may provide contextual help to users of other, non-medically-related, types of applications.

In an embodiment, a physician utilizes a medical records system to access a patient's chart for information about medications, treatment, vital signs, and the like. An exemplary task that may be performed by the physician is to use a charting application to place a physician order for the patient. Suppose the physician has difficulty in using the application to place the order, such as not being able to locate a desired patient, or some particular information about the patient's status. At that point, the physician may not know how to proceed, and may accordingly request help, e.g., click on a help link or icon. In an embodiment, the request for help does not identify a particular help topic, but rather is a general request for help. In some embodiments, a user may have the option of either submitting a general help request or navigating through a help menu to particular topics before submitting a more specific help request.

In response to the request for help, the help system may determine contextual information including information about the physician, such as the identity of the physician, which system the physician is using, which version of application the physician is using, the physician's geographic location, what language he or she is using, and the like. The system may also determine which task the user is trying to perform, e.g., place an order, and how the user got to the point in the process at which he or she got stuck. The contextual information is utilized to determine more specifically what the user needs help with, even though the request may only be a generic request for help. For example, the user may have opened patient records, performed a patient search, opened a particular patient's chart, and is currently trying to place a basic order.

The information about the physician and the current task may be tracked and stored in real time. In an embodiment, when the user requests help, the information is utilized by a help system that maintains and has access to additional information related to the physician and his or her usage of the application. The additional information maintained by the help system may include historical records of the physician's usage of the application for a given previous length of time, such as actions performed within the application, and learning opportunities related to the application that have previously been accessed by, or provided to, the physician. The help system may also have access to a database that maps user tasks to short-term help, i.e., immediate solutions to problems that may be encountered by users of the application, as well as a mapping of user tasks to long-term help, i.e., learning opportunities available to users that are related to the application, task and/or problem encountered by the user.

In one embodiment, the help system provides help to the user even when the user has not requested help. The system may proactively determine that the user is experiencing a problem, based on the information that is tracked in real time. For example, the help system may determine that the user has attempted the same task repeatedly without making progress. As another example, the help system may determine that the user is attempting to perform an action prematurely, before some required information has been entered, or before another prerequisite action has been performed. Another example would be if the user performs a sequence of actions that don't typically belong together, or that do not accomplish anything. A further example would be if the user is taking an inordinately long time to complete a task. Other situations may also arise in which the user's actions indicate the user is struggling with a task.

In one embodiment, the help system utilizes the currently-tracked information about the physician, the task, and the historical information, to identify at least two types of help information, i.e., solutions, that are pushed to the user. A first type of help information provided to the user is contextual short-term help that provides an immediate solution to the problem, enabling the user to get past the point at which he or she is stuck in the current task. The short-term help information may be based on the current contextual information, such as which task the user is attempting to perform, the point at which the user got stuck, the actions performed by the user to get to that point, and the like.

A second type of help information provided to the user is contextual long-term help, i.e., indications of learning opportunities related to the application, current task, and/or problem encountered by the user. The long-term help may be based on the user's historical usage and performance data for a given period of time, e.g., six months. Based on the historical usage and performance data, the system may determine that the user frequently has difficulties performing the current task. In accordance with that determination, the help system may provide recommendations of learning opportunities related to the current task and/or problem, such as tutorials, web-based training, classes, social media pages, online discussion forums, blogs, and the like. The help system may also use the historical records of learning opportunities previously accessed by, or recommended to, the user, to avoid presenting redundant recommendations to the user. For example, if the user's performance does not improve after accessing a recommended learning opportunity, better results may be achieved by recommending a different type of learning opportunity. Additionally, the help system may access usage records of other users to evaluate which types of learning opportunities have proven most helpful for the other users.

Automatically identifying the current task the user is attempting to perform, and providing the user with contextual short-term and long-term help specifically related to the task while the user is in the application and trying to perform the task, is of great benefit to the user. Unlike a help function that requires the user to spend time navigating to the appropriate help topic, or entering search terms to locate the appropriate help topic, an embodiment of the present invention increases the user's efficiency by immediately providing the solution to the user's problem, i.e., the appropriate help information that will get the user past his or her point of difficulty in the application. The user is thus able to complete the current task more quickly without spending time manually tracking down a solution to the problem. Increased efficiency is especially important in very busy environments. As one example, a physician or other health practitioner in a hospital setting may attend to a large number of patients. The required documentation in such a setting is often voluminous, requiring a great deal of the practitioner's time to complete. Even seemingly small reductions in the amount of time spent using an application can add up to a significant saving of time when multiplied by a large number of patients or documents that are maintained or processed with an application.

While the short-term help provides an immediate solution in the moment, the long-term help may require an investment of time on the part of the user, such as taking a class or working through an online tutorial, and so is not practical for the user to pursue while using the application. However, utilizing a long-term solution at a later time enables the user to become more proficient at using the application and performing the tasks that the user has struggled with. Notifying the user of contextual long-term learning opportunities while the user is using the application, and in particular while the user is having a specific problem completing a task, is of great benefit. The user knows exactly which problem the learning opportunities address, and is more likely to appreciate and take advantage of learning opportunities when made aware of the association between the learning opportunities and the problem he or she has encountered in using the application. While the short-term help reduces time spent performing a task by providing an immediate solution to a problem, the long-term help enables the user to become more knowledgeable and more proficient with the application, thus reducing the need for the user to request help during future usage of the application.

In a first aspect, a method is provided for supplying contextual help to a user of an application. A problem encountered by the user while using the application is identified in real time. Identifying the problem may include identifying the current user task, based at least on application checkpoints encountered by the user. In response to identifying the problem encountered by the user in real time, the user is provided with short-term help and long-term help that address the problem. The short-term and long-term help may be identified based at least in part on mappings that associate user tasks with help information applicable to the user tasks.

In a second aspect, a system is provided for supplying contextual help to a user of an application. The system includes one or more databases configured to store a history of actions performed by a user over a given period of time as checkpoints, a mapping of checkpoints to user tasks, a mapping of user tasks to short-term help information that includes immediate solutions to problems associated with the user tasks, and a mapping of user tasks to long-term help information that includes learning opportunities that address the problems associated with the user tasks. The system also includes one or more processing device configured to monitor in real time the actions performed by the user in a current usage session of the application, to identify in real time a problem encountered by the user while attempting to perform a user task, to provide to the user short-term help for the problem, and to provide to the user an indication of long-term help that addresses the problem.

In a third aspect, computer-readable media are provided for facilitating a method of supplying contextual help to a user of an application. Tasks performed by a user in an application are monitored. A problem is identified that is encountered by the user while performing a task within the application. Based at least in part on the task, short-term help is determined for the problem encountered by the user, and long-term help is determined that addresses the problem encountered by the user. While the user is using the application, the short-term help for the problem is provided to the user, and a recommendation of the long-term help that addresses the problem is provided to the user.

Referring now to FIG. 1, an exemplary computing environment (e.g., medical-information computing-system environment) is depicted that is suitable for use with an embodiment of the present invention. The illustrated computing environment is designated generally as computing environment 100. Computing environment 100 is merely an example of one suitable computing environment and is not intended to suggest any limitation as to the scope of use or functionality of the invention. Neither should computing environment 100 be interpreted as having any dependency or requirement relating to any single component or combination of components illustrated therein. Some embodiments of the present invention may be operational with numerous other purpose computing system environments or configurations. Examples of well-known computing systems, environments, and/or configurations that may be suitable for use with some embodiments of the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

Some embodiments of the present invention may be described in the general context of computer-executable instructions, such as program modules, embodied in computer-readable media, being executed by a computer. Exemplary program modules comprise routines, programs, objects, components, and data structures that perform particular tasks or implement particular abstract data types. Some embodiments of the present invention may be practiced in distributed computing environments where tasks are performed by remote processing devices that are linked through a communications network. In a distributed computing environment, program modules may be located in association with local and/or remote computer storage media (e.g., memory storage devices).

With continued reference to FIG. 1, computing environment 100 comprises a computing device 102 in the form of a server, also referred to as server 102. Although server 102 is depicted in FIG. 1 as a single server, in some embodiments server 102 includes multiple servers and/or devices that function individually or together to perform the functions of server 102. Exemplary components of server 102 comprise a processing unit, internal system memory, and a suitable system bus for coupling various system components, including a data store 104, with server 102. The system bus may be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus. Server 102 typically includes therein, or has access to, a variety of computer-readable media. In some embodiments, computing device 102 is a type of computing device other than a server. Exemplary computing devices 100 include other types of network devices, PCs, and the like.

In an embodiment, data store 104 comprises one or more types of computer-readable media configured to store information such as program modules, databases, and the like. In some embodiments, data store 104 comprises one or more processing devices configured to access or facilitate access to the data stored therein. Data store 104 may also comprise an electrical or electronic interface enabling communication with server 102.

Server 102 may operate in a computer network 106 using logical connections to one or more remote computers 108. Remote computers 108 may be located at a variety of locations in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and clinicians' offices. Clinicians may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like. Remote computers 108 may also be physically located in nontraditional medical care environments so that the entire healthcare community may be capable of integration on the network. Remote computers 108 may be personal computers, laptops, servers, routers, network PCs, peer devices, other common network nodes, or the like and may comprise some or all of the elements described above in relation to server 102. The devices can be PDAs, mobile phones, or other like devices. As described above, some embodiments of the present invention are not limited to medical applications. In some embodiments, remote computers 108 may be located at locations in non-medically related environments, e.g., businesses, schools, and the like, and may be accessed by employees, students, or other personnel associated with the particular locations for using non-medically related applications.

Computer networks 106 may comprise local area networks (LANs), personal area networks (PANs), and/or wide area networks (WANs). Such networking environments are commonplace in offices, enterprise-wide computer networks, intranets, and the Internet. When utilized in a WAN networking environment, server 102 may comprise a modem or other means for establishing communications over the WAN, such as the Internet. In a networking environment, program modules or portions thereof may be stored in association with server 102, data store 104, or any of the remote computers 108. For example, an application program 110 that is usable by a clinician or other end user may reside on any one or more of the remote computers 108, and thus be executable by the remote computer 108. In an embodiment, application 110 may be reside on, and executed by, server 102 or another server, in which case remote computer 108 would access application 110 remotely. It will be appreciated by those of ordinary skill in the art that the network connections shown are exemplary and other means of establishing a communications link between the computers (e.g., server 102 and remote computers 108) may be utilized.

In operation, an organization may enter commands and information into server 102 or convey the commands and information to server 102 via one or more of the remote computers 108 through input devices, such as a keyboard, a microphone (e.g., voice inputs), a touch screen, a pointing device (commonly referred to as a mouse), a trackball, or a touch pad. Other input devices comprise satellite dishes, scanners, or the like. Commands and information may also be sent directly from a remote healthcare device to server 102. In addition to a monitor, server 102 and/or remote computers 108 may comprise other peripheral output devices, such as speakers and a printer. Although many other internal components of server 102 and the remote computers 108 are not shown, such components and their interconnection are well known. Accordingly, additional details concerning the internal construction of server 102 and the remote computers 108 are not further disclosed herein.

Figure 2:
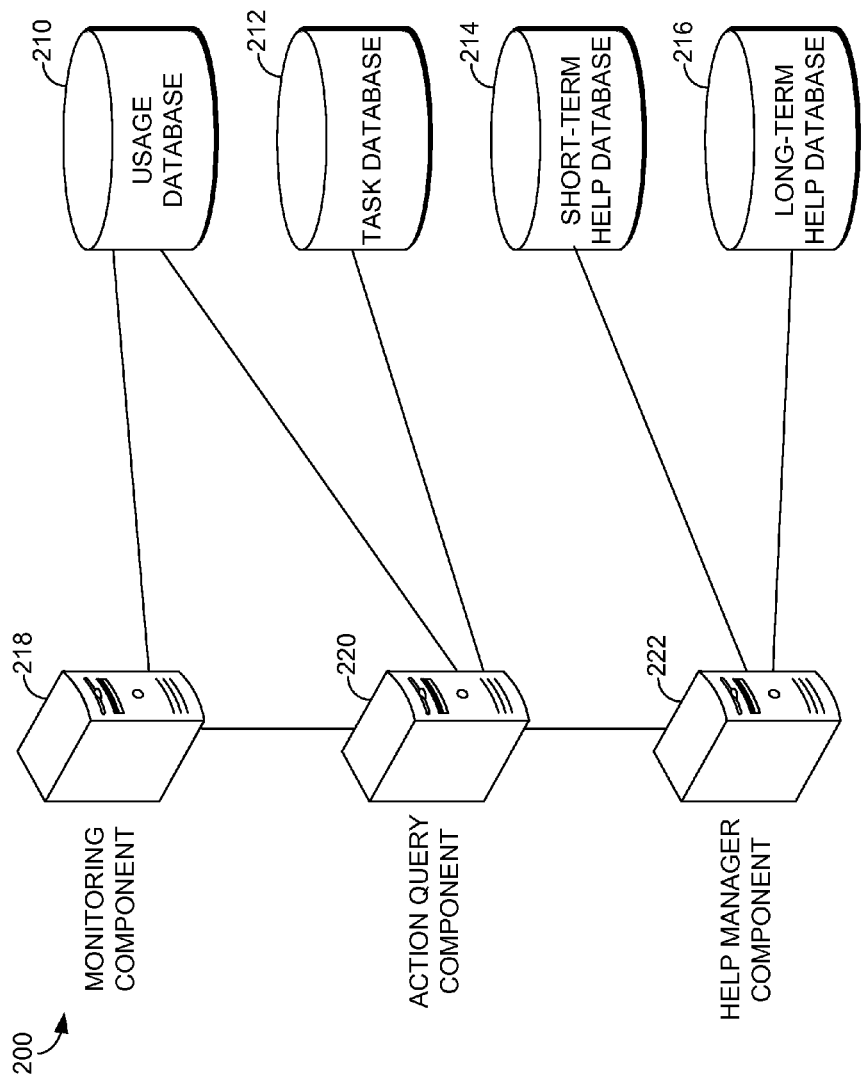
FIG. 2 is a diagram of an exemplary system for providing contextual help suitable for use with an embodiment of the present invention.

Referring now to FIG. 2, an exemplary system for providing contextual help suitable for use with an embodiment of the present invention is depicted, and is generally referred to as system 200. System 200 includes a usage database 210, a task database 212, a short-term help database 214, a long-term help database 216, a monitoring component 218, an action query component 220, and a help manager component 222.

In an embodiment, usage database 210 comprises one or more data storage devices configured to store a history of the user's actions while using an application. The user's actions performed in real time may be stored in usage database 210, which maintains the usage history for a given period of time. For example, a user's usage history may be maintained for the past three months, six months, or other period of time. Maintaining a record of usage history enables a user's performance and proficiency with the application to be measured and evaluated to determine the user's efficiency and improvement over time, as well as other measures and factors related to usage of the application. As one example, timestamps may be stored in association with the user's actions when performing various tasks in the application. The amount of time spent on a given task may be determined, based on the timestamps, for any time in the past at which the user performed the task. Comparing the amount of time spent on the task at an earlier point in time with the amount of time spent on the task at a later point in time, such as the present or within a short time period prior to the present, may provide a measure of the user's proficiency over time. A reduction in the amount of time spent performing the task may be viewed as an improvement in proficiency and/or efficiency. As another example, determining variations over time in how frequently the user requests help while using the application may provide a measure of proficiency and/or efficiency.

In an embodiment, the usage history is stored in the form of checkpoint records. Checkpoints correspond to actions performed by the user within the application. Every user action may invoke a set of code, e.g., a function, routine, or subroutine, or the like, within the application. Every time a set of code is invoked, a record identifying the set of code (or identifying a checkpoint associated with that set of code) may be stored in the usage database as a checkpoint record, indicating that the user invoked that particular functionality. The checkpoint record may be a string of characters or codified data recording which application the user is using, an identification of the user, an identification of the client, a location of the user, a timestamp of when the checkpoint occurred, and the like. Any information that defines or is associated with the user's current usage context may be stored. Additionally, usage database 210 may store a history of short-term and long-term help provided to the user, and which learning opportunities were availed by the user.

System 200 also includes a task database 212. In an embodiment, task database 212 comprises one or more data storage devices configured to store a mapping of checkpoints to user tasks. A given user task within the application may be defined by a minimum of two checkpoints. For two or more checkpoints occurring in the current usage context, the mapping of checkpoints to user tasks may be utilized to determine which task the user is performing, or attempting to perform.

System 200 also includes a short-term help database 214. In an embodiment, short-term help database 214 comprises one or more data storage devices configured to store a mapping of tasks to short-term help, i.e., to immediate solutions to problems that may be encountered by a user while using the application. Based on the current task a user is attempting to perform, the mapping of tasks to short-term help may be utilized to identify help information that specifically addresses the user's immediate need. Other contextual information from the usage database may also be utilized to identify help information to provide to the user, such as which application is being used, the platform, how the user got to the current point in the application, i.e., the user's actions or tasks that led up to the current point, how the user got stuck at that point, and the like.

System 200 also includes a long-term help database 216. In an embodiment, long-term help database 216 comprises one or more data storage devices configured to store a mapping of tasks to long-term help, i.e., learning opportunities that a user may utilize to become more proficient at using the application and/or performing the task at hand. Similar to the short-term help database, the mapping of tasks to long-term help may be utilized to identify appropriate learning opportunities, based on contextual usage information such as which application is being used, the current task a user is attempting to perform, and the like. The learning opportunities may include classes, seminars, online tutorials, webinars, blogs, books, e-books, and the like, which are available to the user. Although depicted in FIG. 2 as individual databases, in some embodiments any or all of usage database 210, task database 212, short-term help database 214, and long-term help database 216 may be contained within a single database. As used herein, references to storing or retrieving data to or from a particular data base, such as usage database 210, does not imply that the database is necessarily separate from the other databases, but simply identifies the particular type of data that is stored or retrieved.

System 200 also includes a monitoring component 218 comprising one or more processing devices configured to monitor the user's usage of the program in real time. Monitoring component 218 may be one or more servers, similar to server 102 described above, or may be one or more other types of computing devices that include one or more features of remote computers 108. Monitoring component 218 may also include an electrical or electronic interface for communicating with external processing devices such as data stores, computers, and the like. In an embodiment, monitoring component 218 receives from the application, which runs on a computing device such as a remote computer 108, a notification of checkpoints that occur while the user is using the application, and stores the checkpoints in usage database 210. The information received from the application may include data identifying the present context of the usage, such as which application the user is using, an identification of the user, an identification of the client, a location of the user, a checkpoint that has occurred, and the like. Any of the contextual usage information may be stored by monitoring component 218 with the checkpoint in a checkpoint record.

System 200 also includes an action query component 220 comprising one or more processing devices configured to query usage database 210. Action query component 220 may be one or more servers, similar to server 102 described above, or may be one or more other types of computing devices including one or more features of remote computers 108. Action query component 220 may also include an electrical or electronic interface for communicating with external processing devices such as data stores, computers, and the like. In an embodiment, checkpoints for the current application session are stored in action query component 220 (or stored by action query component 220 in an associated database) and utilized by action query component 220 to determine the current context of the application usage, e.g., who the user is, what system he/she is using, the application version, the software and/or platform on which the application is executing, and the like. In an embodiment, action query component 220 receives the checkpoints for the current application session directly from the application. In one embodiment, action query component 220 receives the checkpoints for the current application session from monitoring component 218.

Action query component 220 may also use the checkpoint data, in conjunction with the task database, to determine what the user is doing, i.e., the task the user is performing or attempting to perform, how the user got to the current point in the application, i.e., the user's actions or tasks that led up to the current point, and how the user got stuck at that point. As described above, task database 212 stores a checkpoint-to-task mapping enabling action query component 220 to look up tasks associated with specific checkpoints. In an embodiment, action query component 220 also determines, based on information retrieved from usage database 210, a measure of the user's performance while using the application. As described above, usage database 210 maintains the usage history of a user for a given period of time. By analyzing a user's usage history that occurred over time, action query component 220 may determine whether the user's performance has improved. The measure of the user's performance may be based on the amount of time spent performing particular tasks, how frequently the user requests help, whether the user repeatedly requests help for the same task, whether the user has availed him/herself of learning opportunities, and the like.

System 200 also includes a help manager component 222 comprising one or more processing devices configured to provide the help information to the user. Help manager component 222 may include one or more servers, similar to server 102 described above, or may include one or more other types of computing devices including one or more features of remote computers 108. Help manager component 222 may also include an electrical or electronic interface for communicating with external processing devices such as data stores, computers, and the like. In an embodiment, help manager 222 utilizes contextual information received from action query component 220 to determine which short-term and long-term help information to provide to the user. Help manager 222 may also receive the help request from the user, and invoke action query component 220 to obtain the contextual usage information for the user's current application session.

Although depicted in FIG. 2 as individual components, in some embodiments the functionality of any or all of monitoring component 218, action query component 220, and help manager component 222 may be contained within a single component comprising one or more processing devices configured to provide their respective functionalities. The single component may comprise a single server or computing device, or may comprise multiple servers or computing devices, such that processing occurs in a distributed fashion. As used herein, references to the functionalities of an individual component, such as monitoring component 218, do not imply that the component is necessarily a separate device from the other components, but simply identifies a particular type of functionality whether performed by one or many devices. Additionally, it will be appreciated by those of ordinary skill in the art that the interconnections between components and databases depicted in FIG. 2 are exemplary and do not imply that separate devices are necessarily connected in a particular fashion; rather, the interconnections as depicted represent functional connections without regard to whether any or all of the functionalities reside within a single or multiple physical computing devices. Other means of establishing interconnections between the illustrated components and databases may be utilized.

Referring now to FIG. 3, a flowchart depicts an exemplary method suitable for use with an embodiment of the present invention and is generally referred to as method 300. Method 300 is merely an example of one suitable method and is not intended to suggest any limitation as to the scope of use or functionality of the invention. Neither should method 300 be interpreted as having any dependency or requirement relating to any single component or combination of components illustrated therein.

At a step 310, a problem encountered by a user while using an application is identified. In an embodiment, identifying the problem includes identifying a current user task based on checkpoints in the application, which may be accomplished by accessing a stored mapping that maps the checkpoints in the application to user tasks. As described above, the user's actions performed in the application may be tracked in real time and stored for the user's current session by an action query component such as action query component 220, along with other information that provides the current context of the user's actions, such as which application is being used, the platform, how the user got to the current point in the application, i.e., the user's actions or tasks that led up to the current point, how the user got stuck at that point, and the like.

At a step 312, short-term help is provided to the user. As described above, short-term help may be an immediate solution enabling the user to complete the task at hand and get past the point at which he or she is stuck in the current task. In an embodiment, the short-term help information may be based on the current contextual information associated with the user's actions, including the current task. A stored mapping may be accessed that maps user tasks to contextual help information comprising immediate solutions, i.e., short-term help, to problems associated with the user tasks. In an embodiment, the user task may be mapped to a plurality of immediate solutions. In that event, the user may be queried for an indication of which specific problem he or she has encountered to refine the selection of short-term help. When the indication is received from the user, the short-term help may be identified and provided to the user based on that indication.

At a step 314, long-term help for the problem is provided to the user. A stored mapping may be accessed that maps user tasks to long-term help information such as information designating or identifying learning opportunities that are associated with the user tasks. In an embodiment, the long-term help provided to the user includes a designation or indication of a learning opportunity identified at least in part based on the current user task. In an embodiment, when the current user task is mapped to a plurality of learning opportunities, the indication of the learning opportunity is further identified based on a measured effectiveness of individual learning opportunities. For example, usage records of other users may be accessed to evaluate which types of learning opportunities have proven most helpful for the other users, and the learning opportunities may be ranked according to efficacy, based on that historical usage data. The measure of efficacy for individual learning opportunities may be based on the amount by which other users have improved their proficiency at using the application subsequent to availing themselves of the learning opportunities. The measure of efficacy for individual learning opportunities may also be based on feedback received from the other users.

Referring now to FIG. 4, a flowchart depicts an exemplary method suitable for use with an embodiment of the present invention and is generally referred to as method 400. Method 400 is merely an example of one suitable method and is not intended to suggest any limitation as to the scope of use or functionality of the invention. Neither should method 400 be interpreted as having any dependency or requirement relating to any single component or combination of components illustrated therein.

At a step 410, tasks performed by a user within an application are monitored. The monitoring may be performed by one or more servers via a network connection with a computing device that is utilized by the user when accessing the application. In an embodiment, notification of checkpoints that occur while the user is using the application are received from the application and stored for the user's current session by an action query component such as action query component 220 described above. Contextual information may also be received, such as which application the user is using, an identification of the user, an identification of the client, a location of the user, a checkpoint that has occurred, and the like. The checkpoint and contextual usage information may be stored as a checkpoint record.

At a step 412, the current user task is identified based at least on checkpoints, by accessing a stored mapping that maps the checkpoints in the application to user tasks. As described above with regard to FIG. 2, a task performed within the application may be defined by a minimum of two checkpoints. Based at least on two or more checkpoints that have occurred in the current application session, the mapping of checkpoints to user tasks may be utilized to determine which task the user is performing, or attempting to perform. Some or all of the contextual usage information may also be used in determining the user task.

At a step 414, short-term help is determined for the problem encountered by the user. In an embodiment, providing the short-term help includes accessing a stored mapping that maps user tasks to contextual help information, which includes immediate solutions to problems associated with the user tasks. Based at least on the current user task, the mapping of user tasks to contextual help information may be utilized to determine the short-term help. Some or all of the contextual usage information, as well as historical usage information for the user, may also be used in determining the short-term help. The current user task may be mapped to a plurality of immediate solutions associated with different aspects of the task. In that event, an indication may be received from the user that refines the selection of the immediate solution. The indication from the user may be received in response to a query sent to the user as a result of identifying several immediate solutions associated with the task.

At a step 416, long-term help is identified that addresses the problem encountered by the user. In an embodiment, the long-term help includes indications of learning opportunities related to the application, current task, and/or problem encountered by the user. The long-term help may be determined at least by accessing a stored mapping that maps user tasks to designations of learning opportunities. Based at least on the current user task, the mapping of user tasks to designations of learning opportunities may be utilized to identify the long-term help. Some or all of the contextual usage information, as well as historical usage information for the user or other users, may also be used in determining the long-term help. In the event that the current user task is mapped to a plurality of designations of learning opportunities, the designation of the learning opportunity may be further identified based on a ranking of the designations of learning opportunities, wherein the ranking is based on a measured effectiveness of the learning opportunities.

At a step 418, the determined short-term help is provided to the user. In an embodiment, the short-term help is provided to the user in real time, or while the user is still at a point in the application at which the problem occurred or at which he or she is stuck. The short-term help may be communicated to the application in a form that is useable for presentation by the application, either pre-formatted or in a form that the application is able to format for presentation to the user. The short-term help may include instructions or information directly addressing the user's problem, or may include one or more links to documents that provide the short-term help. In addition, or as an alternative, to communicating the short-term help information to the application, the short-term help information may be communicated to the user via a web browser, an email, a text message, or other application.

At a step 420, the identified long-term help is provided to the user. In an embodiment, the long-term help is provided to the user in real time, or while the user is still at a point in the application at which the problem occurred or at which he or she got stuck. The long-term help may be communicated to the application in a form that is useable for presentation by the application, either pre-formatted or in a form that the application is able to format for presentation to the user. The long-term help may include instructions or information, such as portions of a tutorial or manual that the user can save for later use, or may include links or otherwise direct the user to a source of the long-term help. Sources may include online tutorials, webinars, classes (either online or in a classroom), blogs, one-on-one coaching and the like. Similar to the short-term help, the long-term help information may also be communicated to the user via a web browser, an email, a text message, or other application.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for providing contextual help to a user of an application, comprising:
monitoring user actions during a current usage session of the application, wherein the application comprises a plurality of sets of code, wherein each set of code is invoked by a corresponding user action, and wherein each set of code is associated with a respective checkpoint;
for each set of code that is invoked, store a checkpoint record identifying the checkpoint associated with the set of code, wherein the record includes information associated with a current usage context of the user within the application;
proactively identifying in real time a problem encountered by the user while using the application, wherein identifying the problem comprises:

using stored checkpoint records to determine a current usage context of the application and a current user task, and
using the stored checkpoint records to determine an occurrence of one or more of:
the user attempting the current user task repeatedly without making progress,
the user attempting to perform an action prematurely,
the user performing a sequence of actions that do not belong together,
the user performing a sequence of actions that do not accomplish anything, or
the user failing to complete the current user task within a given period of time;
in response to proactively identifying in real time the problem encountered by the user,
based at least in part on the current usage context and the current user task, determining short-term help that is specific to the problem encountered by the user, wherein the short-term help comprises an immediate solution to the problem for the current usage session of the application, and wherein the short-term help is determined at least in part from a database that maps user tasks to short-term help information,
providing the user with short-term help for the problem; and
providing the user with a recommendation for long-term help that addresses the problem, wherein the long-term help comprises a training opportunity that addresses the problem, and wherein the training opportunity is external to the application;
wherein providing the recommendation for long-term help includes accessing a stored mapping that maps user tasks to designations of learning opportunities, wherein the recommendation of the long-term help is identified at least in part on the current user task,
wherein when the current user task is mapped to a plurality of designations of learning opportunities, the designation of the learning opportunity is further identified based on a ranking of the designations of learning opportunities, wherein the ranking is based on a measured effectiveness of the learning opportunities, and
wherein the measured effectiveness of the learning opportunities is based at least in part on an evaluation of usage records of other users that have availed themselves of the learning opportunities, wherein the evaluation of usage records of the other users is based on an amount of time the other users spent completing the current user task before availing themselves of the learning opportunities and an amount of time the other users spent completing the current user task after availing themselves of the learning opportunities.

2. The method of claim 1, wherein identifying the current user task based on checkpoints in the application includes accessing a stored mapping that maps the checkpoints in the application to user tasks.

3. The method of claim 2, wherein providing the short-term help includes accessing a stored mapping that maps user tasks to contextual help information comprising immediate solutions to problems associated with the user tasks, wherein the short-term help comprises an immediate solution to the problem identified at least in part on the current user task.

4. The method of claim 3, wherein when the identified current user task is mapped to a plurality of immediate solutions, then receiving an indication from the user that refines a selection of the immediate solution from the plurality of immediate solutions that are mapped to the current user task.

5. A system for providing contextual help to users of an application, comprising:
  one or more databases that store;
  A) a history of actions performed by a user in an application over a given period of time, wherein the application comprises a plurality of sets of code, wherein each set of code is associated with a respective checkpoint, and wherein the actions are stored within the history as checkpoints associated with respective sets of code invoked by the user,
  B) a first mapping of checkpoints to user tasks, wherein each user task is defined by a minimum of two checkpoints,
  C) a second mapping of one or more of the user tasks to short-term help information comprising immediate solutions to problems associated with the one or more user tasks in the second mapping, wherein for each user task in the second mapping, the second mapping identifies specific help information that provides an immediate solution to a problem associated with the user task; and
  D) a third mapping of one or more of the user tasks to long-term help information comprising learning opportunities available at a later point in time that address the problems associated with the one or more user tasks in the third mapping, wherein for each user task in the third mapping, the third mapping identifies a learning opportunity comprising external training material that pertains to using the application with respect to the user task; and
  one or more processing device configured to;
  A) monitor in real time the actions performed by the user in a current usage session of the application,
  B) proactively identify in real time a problem encountered by the user while attempting to perform a user task, wherein the user task is identified based at least in part on the stored checkpoints in the history of actions performed by the user and the first mapping of checkpoints to user tasks,
  C) utilize the second mapping to identify short-term help that is mapped to the user task,
  D) provide to the user the short-term help for the problem;
  E) utilize the third mapping to identify long-term help that is mapped to the user task, and
  F) provide to the user a recommendation of the long-term help that addresses the problem;
  wherein the recommendation of the long-term help is identified at least in part on the current user task,
  wherein when the current user task is mapped to a plurality of designations of learning opportunities, the designation of the learning opportunity is further identified based on a ranking of the designations of learning opportunities, wherein the ranking is based on a measured effectiveness of the learning opportunities, and
  wherein the measured effectiveness of the learning opportunities is based at least in part on an evaluation of usage records of other users that have availed themselves of the learning opportunities, wherein the evaluation of usage records of the other users is based on an amount of time the other users spent completing the current user task before availing themselves of the learning opportunities and an amount of time the other users spent completing the current user task after availing themselves of the learning opportunities.

6. The system of claim 5, wherein the one or more processing device is further configured to utilize the stored first mapping of checkpoints to user tasks to identify the user task based on checkpoints from the current usage session of the application.

7. One or more computer-readable media having embodied thereon computer-useable instructions that, when executed by one or more computing device, facilitate a method for providing contextual help to a user of an application, comprising:
  monitoring checkpoints that occur while the user is using the application, wherein the application comprises a plurality of sets of code, wherein each set of code is associated with a respective checkpoint, and wherein each checkpoint that occurs corresponds to a set of code invoked by a user action;
  identifying tasks performed by the user in the application based on the monitored checkpoints;
  proactively identifying a problem encountered by the user while performing a task;
  determining short-term help for the problem encountered by the user;
  determining long-term help that addresses the problem encountered by the user, wherein the long-term help comprises a plurality of training opportunities that address the problem;
  accessing historical records that identify training opportunities previously accessed by the user;
  based on the determined long-term help that addresses the problem and the historical records that identify the training opportunities previously accessed by the user, determine a training opportunity that was not previously accessed by the user;
  while the user is using the application,
  A) providing the short-term help for the problem to the user; and
  B) providing to the user a recommendation of the long-term help that addresses the problem, wherein the recommendation comprises the determined training opportunity that was not previously accessed by the user;
  wherein determining the long-term help includes accessing a stored mapping that maps user tasks to designations of learning opportunities, wherein the recommendation of the long-term help is identified at least in part on the current user task,
  wherein when the current user task is mapped to a plurality of designations of learning opportunities, the designation of the learning opportunity is further identified based on a ranking of the designations of learning opportunities, wherein the ranking is based on a measured effectiveness of the learning opportunities, and
  wherein the measured effectiveness of the learning opportunities is based at least in part on an evaluation of usage records of other users that have availed themselves of the learning opportunities, wherein the evaluation of usage records of the other users is based on an amount of time the other users spent completing the current user task before availing themselves of the learning opportunities and an amount of time the other users spent completing the current user task after availing themselves of the learning opportunities.

8. The media of claim 7, wherein identifying the problem includes identifying a current user task based on checkpoints in the application.

9. The media of claim 8, wherein identifying the current user task based on checkpoints in the application includes accessing a stored mapping that maps the checkpoints in the application to user tasks.

10. The media of claim 9, wherein providing the short-term help includes accessing a stored mapping that maps user tasks to contextual help information comprising immediate solutions to problems associated with the user tasks, wherein an immediate solution to the problem is identified at least in part on the current user task.

11. The media of claim 10, wherein when the identified current user task is mapped to a plurality of immediate solutions, then receiving an indication from the user that refines a selection of the immediate solution from the plurality of immediate solutions that are mapped to the current user task.

12. The method of claim 7, wherein the measured effectiveness of the learning opportunities is based at least in part on feedback received from the other users.

\* \* \* \* \*

UNITED STATES PATENT AND TRADEMARK OFFICE
CERTIFICATE OF CORRECTION

PATENT NO. : 10,496,420 B2
APPLICATION NO. : 14/704558
DATED : December 3, 2019
INVENTOR(S) : Uday Illindala et al.

It is certified that error appears in the above-identified patent and that said Letters Patent is hereby corrected as shown below:

In the Claims

Column 17, Line 17: Claim 12 Please remove "method" and replace with --media--.

Signed and Sealed this
Seventh Day of April, 2020

Andrei Iancu
*Director of the United States Patent and Trademark Office*